(12) United States Patent
Yamauchi

(10) Patent No.: US 8,880,284 B2
(45) Date of Patent: Nov. 4, 2014

(54) VEHICLE DATA ACQUISITION SYSTEM AND VEHICLE DATA ACQUISITION METHOD

(75) Inventor: Shinichiro Yamauchi, Fujisawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/878,677

(22) PCT Filed: Oct. 14, 2010

(86) PCT No.: PCT/JP2010/068000
§ 371 (c)(1),
(2), (4) Date: Apr. 10, 2013

(87) PCT Pub. No.: WO2012/049750
PCT Pub. Date: Apr. 19, 2012

(65) Prior Publication Data
US 2013/0190946 A1 Jul. 25, 2013

(51) Int. Cl.
*G07C 5/08* (2006.01)
*G07C 5/00* (2006.01)
*G06F 17/00* (2006.01)

(52) U.S. Cl.
CPC ............ *G06F 17/00* (2013.01); *G07C 5/008* (2013.01); *G07C 5/0858* (2013.01); *G07C 5/085* (2013.01)
USPC ........................................ 701/33.4; 701/34.2

(58) Field of Classification Search
CPC ....... G07C 5/085; G07C 5/0858; G07C 5/008
USPC ................................. 701/33.4, 34.2
See application file for complete search history.

(56) References Cited

U.S. PATENT DOCUMENTS

| | | | | |
|---|---|---|---|---|
| 5,473,540 A | * | 12/1995 | Schmitz | 701/1 |
| 5,583,767 A | * | 12/1996 | Ehlig et al. | 701/1 |
| 6,374,346 B1 | * | 4/2002 | Seshan et al. | 712/221 |
| 6,633,784 B1 | * | 10/2003 | Lovelace et al. | 700/65 |

(Continued)

FOREIGN PATENT DOCUMENTS

| | | | |
|---|---|---|---|
| JP | 2003 84998 | | 3/2003 |
| JP | 2007310827 A | * | 11/2007 |

(Continued)

OTHER PUBLICATIONS

International Search Report Issued Jan. 11, 2011 in PCT/ JP10/68000 Filed Oct. 14, 2010.

*Primary Examiner* — Behrang Badii
*Assistant Examiner* — David Testardi
(74) *Attorney, Agent, or Firm* — Oblon, Spivak, McClelland, Maier & Neustadt, L.L.P.

(57) ABSTRACT

A vehicle data acquisition system that stores, in a memory device, vehicle data acquired by way of a vehicle-mounted information processor. A data acquisition program assisting the acquisition of the vehicle data is dynamically incorporated in the vehicle-mounted information processor. A probe section, which can be replaced with another command, is positioned as an invalid command in one or a plurality of positions in an application program incorporated in advance in the information processor. The data acquisition program replaces the probe section with a vehicle data acquisition command and stores the acquired vehicle data in chronological order in the memory device. The data acquisition program re-replaces the probe section with an invalid command after the vehicle data is acquired.

14 Claims, 6 Drawing Sheets

(56) References Cited

U.S. PATENT DOCUMENTS

| | | | |
|---|---|---|---|
| 6,877,087 B1* | 4/2005 | Yamada et al. | 712/226 |
| 6,985,802 B2* | 1/2006 | Hedges | 701/33.4 |
| 7,054,728 B2* | 5/2006 | Kouda et al. | 701/36 |
| 7,286,047 B2* | 10/2007 | Oesterling et al. | 340/439 |
| 8,131,419 B2* | 3/2012 | Ampunan et al. | 701/31.4 |
| 8,195,428 B2* | 6/2012 | Kamdar et al. | 702/183 |
| 8,296,007 B2* | 10/2012 | Swaminathan et al. | 701/29.1 |
| 8,396,622 B2* | 3/2013 | Underdal et al. | 701/33.3 |
| 2004/0054444 A1* | 3/2004 | Abeska et al. | 701/1 |
| 2011/0144852 A1* | 6/2011 | Kobayashi | 701/29 |
| 2012/0185128 A1* | 7/2012 | Leisenring et al. | 701/34.4 |

FOREIGN PATENT DOCUMENTS

| | | | |
|---|---|---|---|
| JP | 2008015648 A * | 1/2008 | |
| JP | 2009 265823 | 11/2009 | |
| JP | 2010039884 A * | 2/2010 | |
| JP | 2010191658 A * | 9/2010 | |

* cited by examiner

Fig.3A
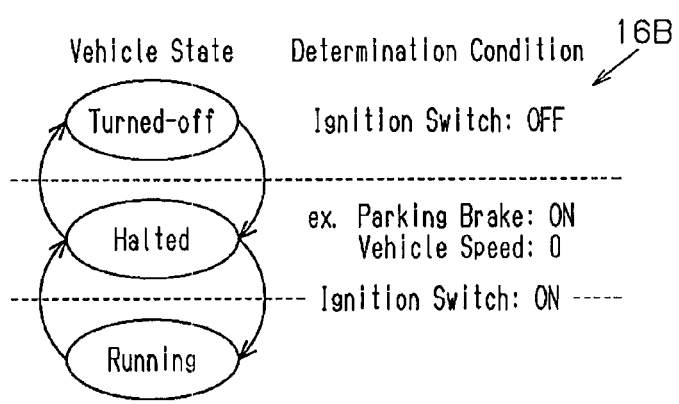
Fig.3B
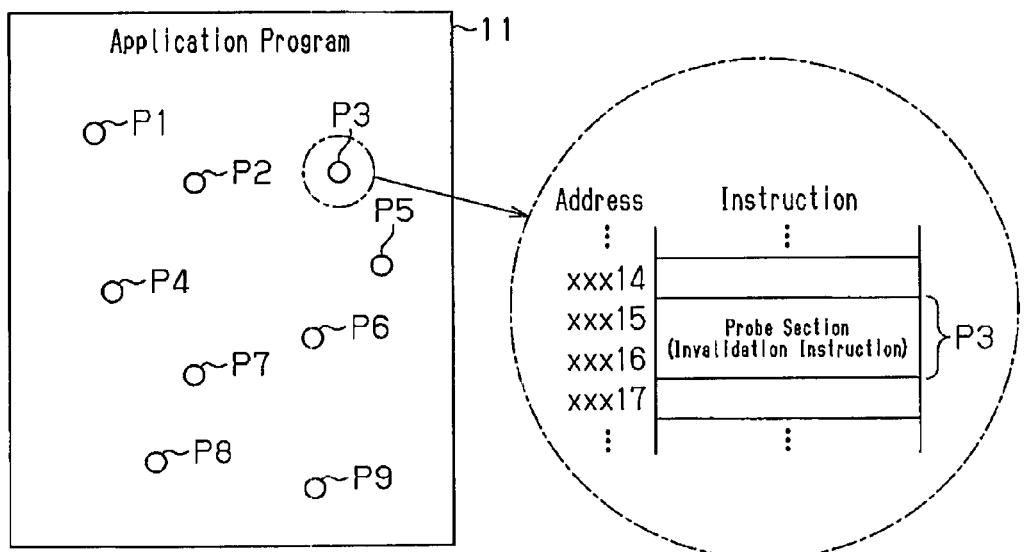
Fig.4

| Probe Section Address | Contents of Replacement | 50 |
|---|---|---|
| xxx15 | Basic Log Function Executing Instruction | |
| xxx60 | CPU State Output Executing Instruction | |
| xxx77 | Basic Log Function Executing Instruction | |
| ⋮ | ⋮ | |

| | | Contents of Checking | 51 |
|---|---|---|---|
| Restriction Condition | Access | Writing is not allowed (Read Only) | |
| | Time | Processing is not completed within specified time (Time Out) | |

VEHICLE DATA ACQUISITION SYSTEM AND VEHICLE DATA ACQUISITION METHOD

FIELD OF THE DISCLOSURE

The invention relates to a vehicle data acquisition system and a vehicle data acquisition method that acquire vehicle data by utilizing an operation of an information processing device installed in a vehicle.

BACKGROUND OF THE DISCLOSURE

Generally, in an operation test and the like of an in-vehicle information processing device such as a navigation system and various control devices and the like installed in a vehicle, an analysis of a vehicle state is performed based on vehicle data acquired through a program executed in the information processing device. Due to this, a function to store the vehicle data acquired as above in a chronological order, or a data log function, is provided in the in-vehicle information processing device. However, since data aimed to be acquired through the in-vehicle information processing device differs in accordance with a target of the analysis such as contents and the like of a malfunction that is a target, in the data log function as above, types, numbers and the like of the pieces of data to be acquired need to be changed in accordance with the target of the analysis. Further, generally, such a change in the data log function is performed by changing a source code itself of the program having the data log function. However, changing the source code as above is a work that can only be performed by an engineer who is experienced with the program, and it would be difficult even for the experienced engineer to accurately change the program that is aimed to be changed.

Thus, conventionally, a technique that can easily change the data log function has been proposed, and an example thereof is described in patent document 1. A system described in Patent Document 1 basically includes a control program that controls a vehicle, and a diagnostic program including the data log function to store the vehicle data while diagnosing respective sections of the vehicle. Further, among them, the diagnostic program changes the vehicle data aimed to be stored and a storing condition thereof based on function change information sent out corresponding to breakdown information from a terminal device for maintenance connected to the in-vehicle information processing device. In accordance therewith, even an engineer who does not have knowledge of the diagnostic program can easily collect the vehicle data for identifying a broken portion by sending out the function change information corresponding to the breakdown information from the terminal device to the in-vehicle information processing device.

PRIOR ART DOCUMENT

Patent Document

Patent Document 1: Japanese Laid-Open Patent Publication No. 2003-84998

SUMMARY OF THE INVENTION

Problems that the Invention is to Solve

As above, according to the system described in Patent Document 1, even in the case where the engineer who is not experienced with the program is an operator, the vehicle data useful for breakdown diagnosis is stored as log data based on function conversion information corresponding to the breakdown information. Further, since the function conversion information corresponding to the breakdown information is prepared in advance, there is no longer a risk of causing an inaccurate alteration in changing the source code of the program.

However, in the above system, the diagnostic program has a processing structure of storing the vehicle data based on a storing condition after the control program has executed (called) a diagnosis process included in the respective control. That is, the vehicle data is collected and stored for each process result by the control program and a decrease in flexibility to integrations and sophistication of programs in recent years is becoming inevitable.

Accordingly, it is an objective of the present invention to provide a vehicle data acquisition system and a vehicle data acquisition method that can acquire vehicle data to be a target of analysis with high flexibility without causing an incorrect alteration in an existing information processing executed through an in-vehicle information processing device.

Means for Solving the Problems

Means for achieving the above objective and advantages thereof will now be discussed.

To achieve the foregoing objective and in accordance with one aspect of the present invention, a vehicle data acquisition system is provided that is configured to acquire vehicle data through an in-vehicle information processing device mounted on a vehicle, and store the acquired vehicle data in a storage device. The in-vehicle information processing device has incorporated therein in advance an information processing section that executes a process procedure of an information processing. The vehicle data acquisition system includes a data acquisition assisting section and a probe section. The data acquisition assisting section is dynamically incorporated in the in-vehicle information processing device so as to assist acquisition of the vehicle data by utilizing an information processing operation state of the in-vehicle information processing device. The probe section is arranged as an invalidation instruction at one or a plurality of positions where data acquiring process included in the process procedure is executed. The probe section is configured to be capable of being replaced with another instruction in accordance with a command from the data acquisition assisting section. By being incorporated into the in-vehicle information processing device, the data acquisition assisting section replaces the probe section with an acquiring instruction for the vehicle data, stores the vehicle data acquired by the replacement in the storage device in a chronological order, and re-replace the probe section with the invalidation instruction after having acquired the necessary vehicle data.

According to the configuration, the probe section can be arranged at the position where the process to acquire a data acquiring target is to be executed among the process procedure of the information processing section in the in-vehicle information processing device. That is, the probe section can be arranged at a position with less restriction in the process procedure, at any position as long as the aimed vehicle data can be acquired. Thus, flexibility in acquiring the vehicle data via the in-vehicle information processing device utilizing the probe section is increased. For example, in a configuration in which data is acquired for each of processing steps included in the information processing section of the in-vehicle information processing device, only the vehicle data corresponding to a result of each of the processing steps can be acquired. However, according to the invention, by arranging the probe section in the process procedure included in the processing step, the vehicle data that indicates the operation state of the in-vehicle information processing device at a greater detail can be acquired. Specifically, regardless of the circuit configuration of the in-vehicle information processing device or processing units of a program thereof, the invention arranges the probe section at a position in the middle of such circuits, or at a position in a middle of a source code configuring the process unit. Due to this, the vehicle data through the in-vehicle information processing device via the probe section can be acquired at a greater detail. As a result, even the vehicle data acquired via the probe section can be acquired as the vehicle data that can be used for performing a highly accurate analysis of the operation state of the in-vehicle information processing device. Due to this, accuracy in finding a cause of a malfunction in the in-vehicle information processing device and the like is improved.

Further, the data acquisition assisting section replaces the invalidation instruction in the probe section with the acquiring instruction for the vehicle data by the in-vehicle information processing device. After the necessary vehicle data has been acquired, the data acquisition assisting section replaces the probe section with the invalidation instruction again. Due to this, since a work for an engineer and the like to directly change the circuit or the source code becomes unnecessary, inaccurate alteration is not made to the circuit or the source code due to alteration and modification. As a result, reliability as the vehicle data acquisition system is also improved.

The data acquisition assisting section may determine whether or not to execute the replacement of the instruction in the probe section in accordance with a state of the vehicle.

According to the configuration, the determination on whether or not to execute the replacement of the instruction in the probe section is made in accordance with the state of the vehicle, such as the vehicle running or being in a turned-off state, or the operation of a key in the vehicle. Due to this, the execution of the replacement of the instruction in the probe section can be performed in the vehicle state suitable for a replacement work. In other words, the execution of the replacement of the instruction in the probe section is prevented from being performed in a vehicle state that is not suitable for the replacement work. Due to this, the replacement work of the instruction in the probe section can be performed while not influencing the running of the vehicle, so safety in the acquiring process of the vehicle data is increased.

The data acquisition assisting section may execute the replacement of the instruction in the probe section under a condition that the vehicle is at a halt.

According to the configuration, the replacement work of the instruction in the probe section is performed while the vehicle is at a halt. Due to this, even with the replacement work of the instruction in the probe section that may influence the running if the vehicle is running, the replacement work can be performed while avoiding such influence on the running. Due to this, the safety in the acquiring process of the vehicle data via the probe section is further increased.

The data acquisition assisting section may be configured not to execute the replacement of the instruction in the probe section when it is predicted that a time required for information processing by the in-vehicle information processing device will exceed a specified time allocated to the information processing due to executing the replacement of the instruction in the probe section.

According to the configuration, the replacement of the instruction in the probe section is not performed when the time predicted to be required for the information processing by the in-vehicle information processing device exceeds the specified time allocated to the information processing, such as the maximum time. Due to this, it is possible to prevent, in the information processing, the occurrence of an inappropriate process such as the information processing by the in-vehicle information processing device being forcefully terminated due to not being completed within the specified time due to the instruction in the probe section having been replaced with the acquiring instruction. As a result, the safety in the acquiring process of the vehicle data via the probe section is increased.

The probe section may be one of a plurality of probe sections, and the data acquisition assisting section may execute the replacement of the instruction in selected one or more of the probe sections such that a time required for information processing by the in-vehicle information processing device does not exceed a specified time allocated to the information processing.

According to the configuration, the replacement of the instruction in only a part of the probe section is performed when the time predicted to be required for the information processing if the replacement of the instruction is performed in all of the probe sections for example exceeds the specified time. By so doing, the time required for the information processing by the in-vehicle information processing device can be made not to exceed the specified time allocated to the information processing. Due to this, the time required for the information processing by the in-vehicle information processing device can be made to be within the specified time. It is possible to prevent the occurrence of an inappropriate process such as the information processing by the in-vehicle information processing device being forcefully terminated due to not being completed within the specified time. As a result, the safety in the acquiring process of the vehicle data via the probe section is increased.

The data acquisition assisting section may be configured not to execute the replacement of the instruction in the probe section when it is determined that the acquiring process to acquire the vehicle data via the probe section will give adverse influence on the information processing executed by the in-vehicle information processing device.

According to the configuration, in the case of determining in advance that the acquiring process of the vehicle data gives adverse influence on the information processing of the in-vehicle information processing device, for example, the data acquisition assisting section does not perform the replacement of the instruction in the probe section. Due to this, the acquiring process of the vehicle data is prevented from giving adverse influence on the information processing being executed by the in-vehicle information processing device.

The data acquisition assisting section may be configured not to execute the replacement of the instruction in the probe section when it is determined that the acquiring process to acquire the vehicle data via the probe section will not fulfill an execution condition in the in-vehicle information processing device.

According to the configuration, when it is predicted that the acquiring process will not fulfill the execution condition in the in-vehicle information processing device, such as the restriction regarding access and the restriction regarding the execution time and the like, the replacement of the instruction in the probe section is not performed. Due to this, the acquiring process of the vehicle data is prevented from giving adverse influence on the information processing being executed by the in-vehicle information processing device.

An acquiring instruction for the vehicle data may be prepared in the data acquisition assisting section in advance, and the acquiring instruction may be created such that a time required for information processing by the in-vehicle information processing device does not exceed a specified time allocated to the information processing.

According to the configuration, even in the case where the instruction in the probe section is to be replaced based on the acquiring instruction, the time required for the information processing by the in-vehicle information processing device does not exceed the specified time allocated to the information processing.

The data acquisition assisting section may be dynamically incorporated into the in-vehicle information processing device via a wired communication or a wireless communication.

According to the configuration, by utilizing the wired communication or the wireless communication, the data acquisition assisting section is dynamically incorporated into the in-vehicle information processing device. Due to this, the data acquisition assisting section does not need to be provided in the in-vehicle information processing device in advance. Due to this, only the process procedure necessary for the information processing is provided in the in-vehicle information processing device, and the data acquisition assisting section can be added to the in-vehicle information processing device by the wired communication or the wireless communication in accordance with the need to acquire the vehicle data. The wired communication includes communication through various types of LAN, and communication using a connecting interface of an external device such as a USB port.

The in-vehicle information processing device is configured to execute the process procedure based on an information processing program that is stored in advance. The probe section is incorporated as an invalidation instruction in the information processing program. The data acquisition assisting section may be implemented by an additional program that includes as a script an acquiring instruction for the vehicle data. The acquiring instruction may be configured to be capable of being loaded to the in-vehicle information processing device and unloaded from the in-vehicle information processing device. The probe section may be replaced with the acquiring instruction for the vehicle data in response to loading of the additional program to the in-vehicle information processing device. The probe section may be re-replaced with the invalidation instruction after having acquired the necessary vehicle data or in response to unloading of the additional program from the in-vehicle information processing device.

According to the configuration, by acquiring the vehicle data via the probe section incorporated in the information processing program, vehicle data by which an operation of the information processing program, that is, the operation state of the in-vehicle information processing device, and moreover an operation of the vehicle can be analyzed in detail can be acquired. Further, even in the case of acquiring the vehicle data from the in-vehicle information processing device by replacing the instruction in the probe section with the acquiring instruction, after the necessary vehicle data has been acquired, the probe section is replaced again with the invalidation instruction by the data acquisition assisting section being unloaded. Due to this, even after the vehicle data has been acquired, the information processing program of the in-vehicle information processing device is restored to an initial state and retained thereat. Due to this, even after the acquiring process for the vehicle data, the safety similar to the initial state is ensured in the information processing.

The vehicle data stored in the storage device may be sent to an analysis center, and the analysis center may analyze a state of the vehicle based on a change in the vehicle data.

According to the configuration, by sending the acquired vehicle data to the analysis center that analyzes the data, the state of the vehicle is analyzed in detail at the analysis center. Due to this, even in the case where the in-vehicle information processing device that is a target of the analysis is far away from the analysis center, the state of the vehicle based on the operation of the in-vehicle information processing device can be analyzed. As a result, tests and investigations of malfunction and the like in the vehicle can be carried out by the vehicle data acquired via the in-vehicle information processing device being analyzed. Due to this, the condition under which the analysis of the vehicle state can be carried out can be moderated, whereby the investigations and tests based on the analysis and the like can more easily be carried out, and it is also possible to facilitate the investigations and tests in a suitable running environment.

The vehicle data may be sent to the analysis center from the storage device via a wireless communication.

According to the configuration, the vehicle data is sent to the analysis center via the wireless communication. Due to this, the vehicle data can be acquired regardless of a capacity of the storage device, and the in-vehicle information processing device can promptly send the vehicle data to the analysis center. Thus, the tests and investigations of the vehicle malfunction and the like by the analysis of the vehicle data can be carried out more promptly.

To achieve the foregoing objective and in accordance with another aspect of the present invention, a vehicle data acquisition method is provided that is configured to acquire vehicle data through an in-vehicle information processing device mounted on a vehicle, and store the acquired vehicle data in a storage device. The in-vehicle information processing device has incorporated therein in advance an information processing section that executes a process procedure of an information processing. The vehicle data acquisition method includes: an incorporating step for dynamically incorporating a data acquisition assisting section in the in-vehicle information processing device, the data acquisition assisting section being configured to assist acquisition of the vehicle data by utilizing an information processing operation state of the in-vehicle information processing device; a replacing step for replacing, with an acquiring instruction for the vehicle data, a probe section arranged as an invalidation instruction at one or a plurality of positions where data acquiring process included in the process procedure is to be executed in response to incorporating of the data acquisition assisting section into the in-vehicle information processing device, wherein the probe section is configured to be capable of being replaced with another instruction in response to a command from the data acquisition assisting section; a storing step for storing the vehicle data acquired by the replacement in the storage device in a chronological order; and a re-replacing step for re-replacing the probe section with the invalidation instruction after having acquired the necessary vehicle data.

According to the method, the probe section can be arranged at any position, as long as it is a position where the process to acquire the data acquiring target is to be executed among the process procedure of the information processing section in the in-vehicle information processing device, that is, the position with less restriction in the process procedure to acquire the aimed vehicle data. Thus, flexibility in acquiring the vehicle data via the in-vehicle information processing device utilizing the probe section is increased. For example, in a case where data is acquired for each of the processing steps included in the information processing section of the in-vehicle information processing device, only the vehicle data corresponding to a result of each of the processing steps can be acquired. However, according to the invention, by arranging the probe section in the process procedure included in the processing step, the vehicle data that indicates the operation state of the in-vehicle information processing device at a greater detail can be acquired. Specifically, regardless of the circuit configuration of the in-vehicle information processing device or processing units of a program thereof, the invention arranges the probe section at a position in a middle of such circuits, or at a position in a middle of a source code configuring the process unit. Due to this, the vehicle data through the in-vehicle information processing device via the probe section can be acquired at a greater detail. As a result, even the vehicle data acquired via the probe section can be acquired as the vehicle data with which a highly accurate analysis of the operation state of the in-vehicle information processing device can be performed. Due to this, accuracy in finding a cause of the malfunction in the in-vehicle information processing device and the like is improved.

Further, the data acquisition assisting section replaces the invalidation instruction in the probe section with the acquiring instruction for the vehicle data through the in-vehicle information processing device. After the necessary vehicle data has been acquired, the data acquisition assisting section replaces the probe section with the invalidation instruction again. Due to this, since a work for an engineer and the like to directly change the circuit or the source code becomes unnecessary, in accurate alteration is not made to the circuit or the source code due to alteration and modification. As a result, reliability as the vehicle data acquisition system is also improved.

In the replacing step, a determination on whether or not to execute the replacement of the instruction in the probe section may be made in accordance with a state of the vehicle.

According to the method, the determination on whether or not to execute the replacement of the instruction in the probe section is made in accordance with the state of the vehicle, such as the vehicle running or being in a turned-off state, or the operation of the key in the vehicle. Due to this, the execution of the replacement of the instruction in the probe section can be performed in the vehicle state suitable for the replacement work. In other words, the execution of the replacement of the instruction in the probe section is prevented from being performed in the vehicle state that is not suitable for the replacement work. Due to this, the replacement work of the instruction in the probe section can be performed while not influencing the running of the vehicle, so safety in the acquiring process of the vehicle data is increased.

BRIEF DESCRIPTION OF THE DRAWINGS

FIGS. 3A and 3B show a running condition of the data acquiring program in the in-vehicle information processing device shown in FIG. 1, where FIG. 3A is a diagram showing the running condition in accordance with a vehicle key state, and FIG. 3B is a diagram showing a more detailed condition of the running condition of FIG. 3A;

FIG. 4 is a schematic diagram schematically showing probe sections included in the application program shown in FIG. 1;

DETAILED DESCRIPTION OF THE PREFERRED EMBODIMENTS

First Embodiment

Figure 1:
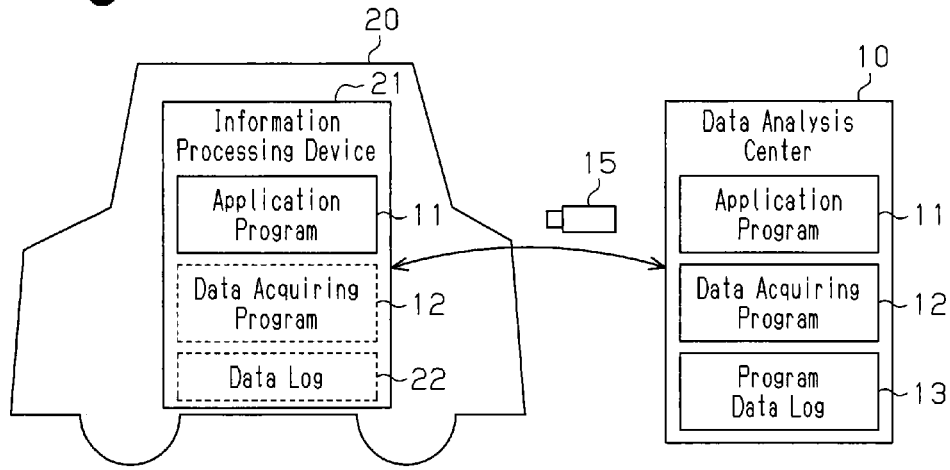
FIG. 1 is a block diagram showing a schematic configuration of a vehicle data acquisition system according to a first embodiment of the present invention.

A vehicle data acquisition system according to a first embodiment of the invention will now be described with reference to FIGS. 1 to 12. FIG. 1 is a block diagram showing an outline of the vehicle data acquisition system.

As shown in FIG. 1, the vehicle data acquisition system includes an in-vehicle information processing device 21 installed in a vehicle 20, which is a moving body. The in-vehicle information processing device 21 transmits and receives various types of data such as program data and log data to and from a data analysis center 10 located outside the vehicle 20.

The data analysis center 10 performs tests and investigations of an operation state and the like of the vehicle 20 by analyzing data log acquired from an information processing device such as various control devices installed in the vehicle 20. In the present embodiment, the data analysis center 10 performs analysis of the state of the vehicle 20 based on vehicle data acquired in the vehicle 20 by the application program 11 being utilized upon the test and the like of the operation state of the vehicle 20, where the application program 11 is an information processing program executed by the in-vehicle information processing device 21 installed in the vehicle 20. The various operation tests and the like that the data analysis center 10 performs include tests and investigations regarding malfunctions of the vehicle 20, and malfunctions in the in-vehicle information processing device 21 installed in the vehicle 20. The data log that the data analysis center 10 uses in the analysis (data log 22 to be described below in detail) is data log created by the vehicle data, which is acquired and stored in relation to an operation of the application program 11 executed in the in-vehicle information processing device 21, being recorded in a chronological order. That is, in the present embodiment, the in-vehicle information processing device 21 of the vehicle 20 realizes a data log function that creates the data log 22 formed from the vehicle data.

The data analysis center 10 retains an application program 11 identical to the application program 11 installed in the in-vehicle information processing device 21. The data analysis center 10 may be configured to create a program identical to the application program 11 each time as needed, or be capable of acquiring the same from outside.

Further, the data analysis center 10 retains a data acquiring program 12, which can configure a data acquisition assisting section in the vehicle 20, by being introduced into the in-vehicle information processing device 21. That is, the data acquiring program 12 has a data log function of creating the data log 22 by being executed in the in-vehicle information processing device 21, where the data log 22 is of the vehicle data acquired by utilizing the application program 11 being executed in the in-vehicle information processing device 21, such as data indicating various vehicle states, data of internal variables of programs and the like. Accordingly, since the data analysis center 10 retains the application program 11 identical to that executed in the in-vehicle information processing device 21, the data acquiring program 12 that is to acquire the vehicle data by utilizing the application program 11 being executed in the in-vehicle information processing device 21 in the vehicle 20 can suitably be produced and managed.

Further, a program data log 13 is retained in the data analysis center 10. The program data log 13 is created by a data log 22 of the vehicle data acquired in the in-vehicle information processing device 21 being transferred to the data analysis center 10. That is, the data log 22 acquired by the in-vehicle information processing device 21 is retained in the data analysis center 10 as a program data log 13.

In the data analysis center 10, the state of the vehicle 20, for example, the state of the in-vehicle information processing device 21 is analyzed based on the program data log 13. To describe in further detail, based on the application program 11 and the data acquiring program 12, the data analysis center 10 can determine under what condition and situation the data included in the program data log 13 formed from the data log 22 of the vehicle data was acquired in the vehicle 20. According to the above, the data analysis center 10 can analyze the various operation states of the vehicle 20 based on the program data log 13, and can further analyze the states of the vehicle 20 through such analysis, for example, a state of the in-vehicle information processing device 21 and an operation state of the application program 11.

The data analysis center 10 can transfer the data acquiring program 12 that it retains to a portable storage device 15 such as a USB memory. On the other hand, the data analysis center 10 can acquire the data log 22 stored in the vehicle 20 as the program data log 13 via the portable storage device 15. That is, the data acquiring program 12 that the data analysis center 10 has is configured to be transferred to the in-vehicle information processing device 21 of the vehicle 20 via the portable storage device 15. On the other hand, the data log 22 of the vehicle 20 is configured to be transferred from the vehicle 20 to the data analysis center 10 via the portable storage device 15.

Figure 2:
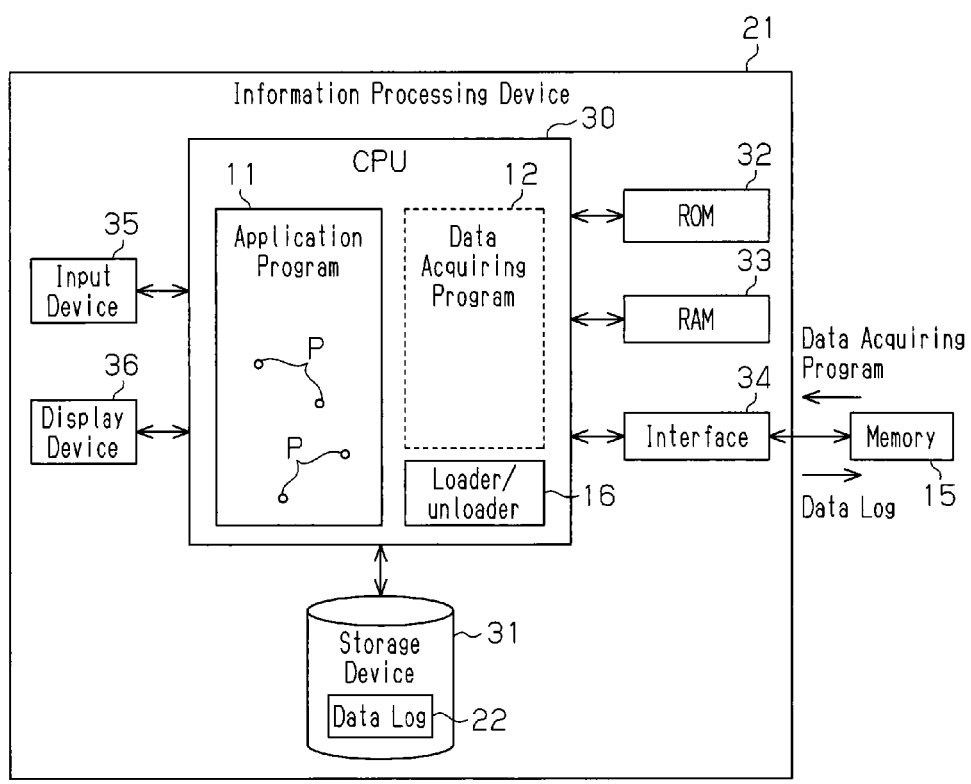
FIG. 2 is a block diagram showing a schematic configuration of the in-vehicle information processing device shown in FIG. 1.

As shown in FIG. 2, the in-vehicle information processing device 21 configures a navigation system, which is an example of various information devices installed in the vehicle 20. The in-vehicle information processing device 21 is configured mainly of a microcomputer as an information processing section that includes a processing device (vehicle CPU) 30, a storage device 31, a non-volatile memory (ROM) 32, a volatile memory (RAM) 33 and the like, and executes various information processing based on the various data and programs stored in the storage device 31 or the memory 32, 33. Further, the in-vehicle information processing device 21 is provided with an input device 35, a display device 36, and an interface 34 to which a memory such as the portable storage device 15 can be connected.

The input device 35 is a device for a user to input information such as manipulating information to the in-vehicle information processing device 21, includes buttons displayed on a touch panel, buttons provided at a front panel and the like, and is configured to cause information according to manipulation by the user to be input to the in-vehicle information processing device 21.

The display device 36 is a device that displays characters/image information and provides the same to the user, and information such as a vehicle location and map information is displayed therein by images and the like.

The storage device 31 is a known storage device, and is configured of a HDD (Hard Disk Drive), which is a non-volatile storage device, a non-volatile memory (EEPROM or the like) and the like. Various types of data and programs to be used in various information processing executed in the vehicle CPU 30 are stored in the storage device 31, and the data log 22 formed from the vehicle data acquired by utilizing the application program 11 is also stored.

The ROM 32 is a non-volatile memory, and retains in advance defined programs that are executed and processed by the vehicle CPU 30, such as the application program 11 and the like.

The RAM 33 is a volatile memory and the like, and temporarily retains the programs that are executed by the vehicle CPU 30 and variables (parameters) to be used in the programs. For example, in the RAM 33, the program and the internal variables of the application program 11 of which execution process is being performed in the vehicle CPU 30, and the variables such as vehicle speed that indicate a running state of the vehicle 20 are temporarily retained.

The interface 34 enables the connection of various external devices (external media) to the in-vehicle information processing device 21, and in the present embodiment, has a USB standard connector port. In using this, the portable storage device 15 with the USB standard, a USB memory can be connected to the in-vehicle information processing device 21 via the interface 34. Thus, the in-vehicle information processing device 21 can read from and write in the portable storage device 15 connected to the interface 34 by using the vehicle CPU 30, with which access becomes enabled. Due to this, the in-vehicle information processing device 21 can cause the data stored in the storage device 31 or the RAM 33 to be transferred to the portable storage device 15, or otherwise cause the data stored in the portable storage device 15 to be transferred to the storage device 31 or the RAM 33.

When activated, the in-vehicle information processing device 21 automatically causes the vehicle CPU 30 to execute the application program 11, which is retained in advance in the ROM 32 and the like. Due to this, the application program 11, which is a program as the navigation system, is automatically started in the in-vehicle information processing device 21 after power is turned on. On the other hand, by a designation after being activated, the in-vehicle information processing device 21 can acquire the data acquiring program 12 retained in the portable storage device 15 and execute the same in the vehicle CPU 30.

The in-vehicle information processing device 21 causes the vehicle CPU 30 to execute a loader/unloader 16. The loader/unloader 16 causes the vehicle CPU 30 to additionally execute a program based on a certain addition condition, and on the other hand deletes the program that the vehicle CPU 30 has additionally executed based on a certain deletion condition. The loader/unloader 16 is retained in advance in the ROM 32 or the storage device 31, and the execution by the vehicle CPU 30 is automatically started after the power of the in-vehicle information processing device 21 is turned on. That is, the loader/unloader 16 is executed in the vehicle CPU 30 as a program independent from the application program 11 so as not to interfere with the process of the application program 11. The loader/unloader 16 may be included in the application program 11. Further, the loader/unloader 16 may be configured to be executed in the vehicle CPU 30 at a necessary timing.

When the connection of the portable storage device 15 to the interface 34 is detected by executing the loader/unloader 16, the in-vehicle information processing device 21 checks whether or not the data acquiring program 12 is retained in the portable storage device 15. Further, when the data acquiring program 12 is detected as being retained in the portable storage device 15 by the execution of the loader/unloader 16, the in-vehicle information processing device 21 transfers the data acquiring program 12 to the RAM 33. Then, when it is determined that a certain starting condition defined by a running condition, a key operation of the vehicle 20 and the like is satisfied, the in-vehicle information processing device 21 causes the data acquiring program 12 transferred to the RAM 33 to be subjected to execution process in the vehicle CPU 30, that is, the in-vehicle information processing device 21 runs the data acquiring program 12. In contrast, when it is determined that a certain ending condition defined by the running condition, the key operation of the vehicle 20, a detachment of the portable storage device 15 from the interface 34 and the like is satisfied, the in-vehicle information processing device 21 executes a process to end the data acquiring program 12. Further, after the data acquiring program 12 has been ended, the in-vehicle information processing device 21 deletes the data acquiring program 12 from the RAM 33 and the like.

FIG. 3A shows a starting condition list 16A, in which an example of the certain starting condition used in the determination as whether to run the data acquiring program 12 is set. In the starting condition list 16A, a certain starting condition based on the key state is set. In the certain starting condition, as a condition not to run the data acquiring program 12, a case of an OFF state in which an accessory switch (ACC) is turned off is set regardless of an OFF state in which an ignition switch (IGN) is turned off and an ON state in which the ignition switch is turned on. Further, in the certain starting condition, as a condition to run the data acquiring program 12, a case in which the ignition switch is OFF and the accessory switch is ON is set. Further, in the certain starting condition, as a condition to run the data acquiring program 12 on condition that the vehicle state is at a halt, a case in which the ignition switch is ON and the accessory switch is also ON is set.

Further, FIG. 3B shows an example of determining that the vehicle state is at a halt in a condition explaining diagram 16B. The condition explaining diagram 16B indicates conditions to determine the respective vehicle states of a turned-off state, an at-a-halt state, and a running state. The turned-off state of the vehicle 20 is determined for example when the ignition switch is OFF. The at-a-halt state of the vehicle 20 is determined for example when the ignition switch is ON, the parking brake is ON state, indicating that it is being used, and the vehicle speed is 0 km/h. The running state of the vehicle 20 is determined for example when the ignition switch is ON, the parking brake is not being used, and the vehicle speed is not 0 km/h. Due to this, in a case where the certain starting condition includes the vehicle being the at a halt state, such a condition is properly determined.

Next, the details of the application program 11 and the data acquiring program 12 will be described with reference to FIGS. 4 and 5.

As shown in FIGS. 2 and 4, the application program 11 has a plurality of probe sections P (P1 to P9) incorporated in advance. The probe sections P are arranged at positions that will be executed and processed in the course of the application program 11 when the application program 11 is executed. The positions of the probe sections P1 to P9 in the application program 11 are arbitrary, so they may be provided at a starting position or ending position of various processes, for example, and may also be provided in the course of the various processes, that is, in the middle of the program. For example, as shown in FIG. 4, the probe section P3 includes an address xxx15 and address xxx16 in the middle of an instruction of the program, and an invalidation instruction (for example, the NOP instruction) is arranged in each address. Accordingly, the probe section P includes the two addresses and the invalidation instructions set therein suppresses a size and an increase in a processing load of the application program 11 as much as possible. Due to this, in the application program 11, an increase in an execution time required due to the arrangements of the probe sections P is suppressed as much as possible even in the case where the probe sections P (P1 to P9) are provided, and the execution time and a load rate for the vehicle CPU 30 are maintained substantially similar to those in a case where the probe sections P are not provided. That is, the probe sections P1 to P9 of the present embodiment do not add new load on the application program 11 even when provided in the application program 11. A reference sign xxx used for example in the number of the address xxx15 is a sign that indicates an abbreviation of a specific value, is not limited to a specific value, and can be substituted with an arbitrary value with arbitrary digits.

As the arranged positions of the probe sections P1 to P9, portions where the vehicle data suitable for analyzing the operation state of the vehicle 20 can be acquired are preferable. Further, the vehicle data includes data related to a running state of the vehicle 20, such as speed, acceleration, vibration, position, and the like, and data related to engine control and the like. Further, the vehicle data includes internal variables of the application program 11, variables indicating the operation state of the vehicle CPU 30, variables indicating a state of an OS and the like, and variables related to program changes. Further, the vehicle data also includes contents of stacks (stackdump) that are a data structure that performs input and output of data related to program processing by the last-in first-out method, contents of a memory (memory dump) that the program uses and the like.

Since the probe sections P are incorporated in advance in the application program 11, the data analysis center 10 can acquire the arranged positions of the probe sections P in the application program 11 from the application program 11 retained by the data analysis center 10. That is, the data analysis center 10 is configured to be capable of creating the data acquiring program 12 that can acquire the vehicle data by utilizing the application program 11 by having grasped the positions of the probe sections P arranged in the application program 11.

Figures 5, 6, 7:
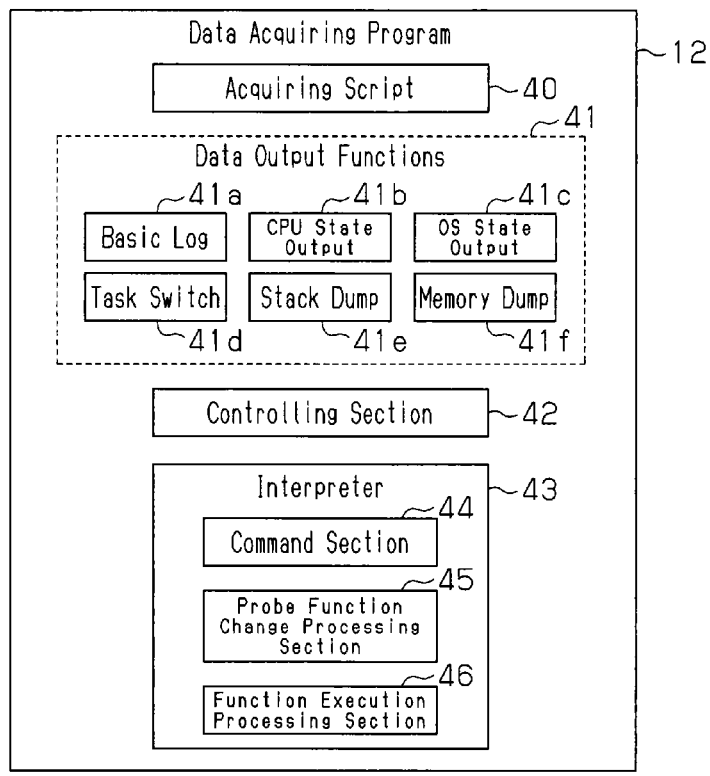
FIG. 5 is a block diagram showing a schematic configuration of a data acquiring program that is loaded to the in-vehicle information processing device shown in FIG. 1.
FIG. 6 is a diagram of a list indicating contents of collection scripts included in the data acquiring program shown in FIG. 5.
FIG. 7 is a diagram showing a condition for the data acquiring program to replace a probe section in the in-vehicle information processing device shown in FIG. 1.

As shown in FIG. 5, the data acquiring program 12 is provided with an acquiring script 40, data output functions 41, an acquisition controlling section 42 that manages the data acquiring program 12, and an interpreter 43.

The acquiring script 40 defines the positions of the probe sections P, which change the function so that the vehicle data can be acquired, and contents of the change of the probe sections P. The acquiring script 40 is created by the data analysis center 10 and the like in accordance with the target to be analyzed upon the operation test and the like of the vehicle 20. Basic scripts for the analysis target and scripts for the frequently investigated target may be prepared in advance in the data analysis center 10.

In the acquiring script 40, a probe function changing list 50 shown in FIG. 6, in which a function to be changed for each of the probe sections P that is to be the target of the function change is set, and a change enabling condition 51 shown in FIG. 7 that defines a condition to allow the change in the probe sections P are set.

As shown in FIG. 6, the probe function changing list 50 includes one or more probe sections P having a function that is to be changed to acquire the vehicle data are set, and a function after the change is set for each of the one or more probe sections P that are set. For example, one probe section P3 (address xxx15) included in the application program 11 being executed in the vehicle CPU 30 is set to be changed to an instruction to execute a basic log function (basic log function 41a to be described below) that is a type of an acquiring instruction. Further, another probe section P4 (address xxx60) in the application program 11 being executed is set to be changed to an instruction to execute a function to cause a CPU state to be output (CPU state output function 41b to be described below) that is a type of the acquiring instruction. Moreover, yet another probe section P5 (address xxx77) in the application program 11 being executed is set to be changed to an instruction to execute the basic log function 41a that is a type of the acquiring instruction. That is, settings of the respective probe sections P are respectively replaced based on the probe function changing list 50.

The change enabling condition 51 is a limiting filter in which items (limiting conditions) and contents thereof are set, the items being those that should be checked as conditions for determining whether the respective probe sections P may be replaced or not in accordance with the probe function changing list 50. In a case where the change enabling condition 51 is satisfied, the instructions to the probe sections P in the application program 11 are replaced based on the probe function changing list 50. On the other hand, in a case where the change enabling condition 51 is not satisfied, the instructions to the probe sections P in the application program 11 are not replaced. Due to this, a determination on whether or not processes performed in line with the acquiring script 40 influence the application program 11 and the like that are operating normally is made in advance.

As shown in FIG. 7, for example, a limiting condition related to access and a limiting condition related to time are set in the change enabling condition 51. The limiting condition related to access is a condition for confirming whether or not each address set in the probe function changing list 50 is an address that can be accessed by the data acquiring program 12. For example, in a case where all of the addresses set in the probe function changing list 50 are writable addresses, it is determined that no access limitation is imposed on the contents of the settings in the probe function changing list 50. On the other hand, in a case where even one of the respective addresses set in the probe function changing list 50 is an address to which writing is not allowed, it is determined that the access limitation is imposed on the contents of the settings of the probe function changing list 50.

Further, the limiting condition regarding time is a condition for checking in advance whether or not the execution time of the application program 11 will exceed a specified time by the replacement of the instructions of the probe sections P as set in the probe function changing list 50. The specified time is a maximum time that can be required for one execution in for example periodically executing the application program 11. A calculation of the execution time of the application program 11 can be performed by adding an accumulation of time that the interpreter 43 requires for the execution by the replacement of the instructions of the respective probe sections P set in the probe function changing list 50 to the execution time of the application program 11. That is, in a case where it is predicted that the execution time of the application program 11 will not exceed the specified time even with the replacement of the instructions in the respective addresses set in the probe function changing list 50, it is determined that no time limitation is imposed on the contents of the settings of the probe function changing list 50. On the other hand, in a case where it is predicted that the execution time of the application program 11 will exceed the specified time by the replacement of the instructions in all of the addresses set in the probe function changing list 50, it is determined that the time limitation is imposed on the contents of the settings of the probe function changing list 50.

As shown in FIG. 5, the data output functions 41 are a plurality of functions for acquiring certain vehicle data by utilizing the application program 11, and storing the acquired vehicle data in the storage device 31 and the like as the data log 22. The functions include, for example, the basic log function 41a, the CPU state output function 41b, the OS state output function 41c, a task switching function 41d, a stack dump function 41e, a memory dump function 41f. The basic log function 41a is a function that creates the data log of the internal variables of the application program 11. On the other hand, the CPU state output function 41b is a function that creates the data log of the variables such as counters and clocks indicating the operation state of the vehicle CPU 30. Further, the OS state output function 41c is a function that creates the data log of the variables indicating used memory capacity and an addition rate that indicates the state of the OS and the like. The task switching function 41d is a function that creates the data log of the variables indicating an execution state of the respective programs among the programs being executed in the vehicle CPU 30, and priority of the programs. Moreover, the stack dump function 41e is a function that creates the data log of the stack dump that is the contents of the memory stack. The memory dump function 41f is a function that creates the data log of the memory dump that is the contents of the memory where the program is being executed, or the variables are retained.

The acquisition controlling section 42 controls the execution of the data acquiring program 12, and manages the determination of the change enabling condition 51 in the interpreter 43 and the execution and termination and the like of the acquiring script 40, and also manages the data transmission through the interface 34 and the like. For example, the acquisition controlling section 42 causes the interpreter 43 to determine whether or not the acquiring script 40 fulfills the change enabling condition 51. Then, in a case where the change enabling condition 51 is fulfilled, the acquisition controlling section 42 causes the interpreter 43 to execute the acquiring script 40. On the other hand, in a case where the change enabling condition 51 is not fulfilled, the acquisition controlling section 42 manages such that the interpreter 43 does not execute the acquiring script 40. Further, for example, in a case where the acquisition of the vehicle data is ended, the acquisition controlling section 42 performs processes to cause the necessary data log 22 to be transferred to the portable storage device 15.

The interpreter 43 performs the execution process by sequentially interpreting the source codes included in the acquiring script 40 and the data output functions 41 by utilizing the processing function of the vehicle CPU 30. A command section 44 is provided in the interpreter 43. Execution programs that are set in advance to be utilized by the interpreter 43 are provided in the command section 44, and in the present embodiment, and include a replacing command to replace the instructions in the probe sections P, and a re-replacing command to replace the instructions in the probe section P again.

Further, the interpreter 43 is provided with a probe function change processing section 45 that replaces and re-replaces the instructions in the probe sections P based on the acquiring script 40, and a function execution processing section 46 for executing the functions included in the data output functions 41 and the like. That is, when the execution process for the acquiring script 40 is performed by the interpreter 43, the replacing and re-replacing the instructions in the probe sections P are executed by the probe function change processing section 45. Further, the respective functions 41*a* to 41*f* included in the data output functions 41 are configured such that certain processes are performed by being processed by the interpreter 43. In the present embodiment, upon when the interpreter 43 creates the data log 22, the interpreter 43 is configured to create the data log 22 in the storage device 31.

Next, the replacement of the instructions in the probe sections P will be described with reference to FIGS. 8 and 9. The probe section P3 will be taken as an example to describe the replacement of the instructions in the probe sections P. Since the replacement and re-replacement of instructions in the other probe sections P1, P2, and P4 to P9 are similar, description of the other probe sections P are omitted.

Figure 8:
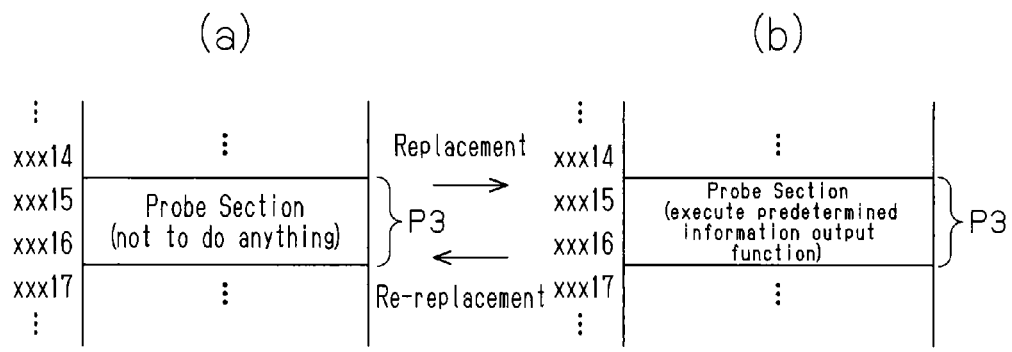
FIG. 8 shows a manner in which the data acquiring program shown in FIG. 5 changes an application program, where section (a) is a diagram schematically showing a probe section of the application program, and section (b) is a diagram schematically showing a state in which the probe section of the application program shown in section (a) is replaced.

As shown in FIG. 8(*a*), the address xxx15 and the address xxx16 of the application program 11 have the probe section P3 incorporated therein when the application program 11 is created for example in the data analysis center 10. The instruction that does not to do anything (invalidation instruction) is arranged as an instruction in the probe section P3. Further, as shown by an arrow from FIG. 8(*a*) to FIG. 8(*b*), when the replacement of the instruction in the probe section P3 is executed by the data acquiring program 12, the instruction arranged in the probe section P3 is replaced with an instruction to execute a certain output function included in the data acquiring program 12.

On the other hand, as shown by an arrow from FIG. 8(*b*) to FIG. 8(*a*), the instruction in the probe section P3 is replaced again by the data acquiring program 12. The re-replacement of the instruction is executed after the data acquiring program 12 has acquired the necessary vehicle data, or when the data acquiring program 12 is deleted from the in-vehicle information processing device 21, upon being unloaded. That is, the instruction in the probe section P3 is replaced again with the instruction not to do anything (invalidation instruction). By such a re-replacement, the application program 11 is restored to a state before the instruction in the probe section P3 is replaced, that is, to an initial state in which the application program 11 was created and retained therein.

Figure 9:
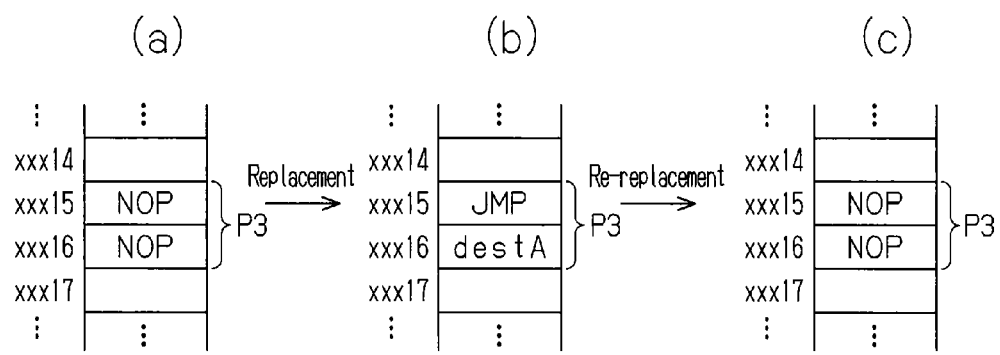
FIG. 9 shows a manner in which the data acquiring program shown in FIG. 5 changes probe sections of the application program, where section (a) is a diagram showing a state in which an NOP instruction (Non Operation instruction) is arranged in the probe section, section (b) is a diagram showing a state in which the NOP instruction of the probe section has been replaced with JMP instruction (jump instruction), and section (c) is a diagram showing a state in which the replaced probe section has been replaced again with the NOP instruction.

Specifically, as shown in FIG. 9(*a*), in the probe section P3, the NOP instruction arranged at the address xxx15 and address xxx16 of the application program 11 is replaced with the acquiring instruction when the replacement of the instruction in the probe section P3 is executed. Due to this, as shown in FIG. 9(*b*), the NOP instruction is replaced with a jump instruction (JMP instruction) for causing the executing portion of the program to be moved to an address destA, where the acquiring instruction is realized (see FIG. 9(*b*)), and the basic log function 41*a* of the data acquiring program 12 for example is enabled to be executed. On the other hand, the JMP instruction arranged at the address xxx15 and address xxx16 of the application program 11 is replaced again with the NOP instruction as the invalidation instruction as shown in FIG. 9(*c*) when the re-replacement of the instruction in the probe section P3 is executed.

The probe function change processing section 45 references the probe function changing list 50 so as to select a probe section P in which the instruction needs to be replaced again after the instruction has been replaced from among the probe sections P of the application program 11.

Figure 12:
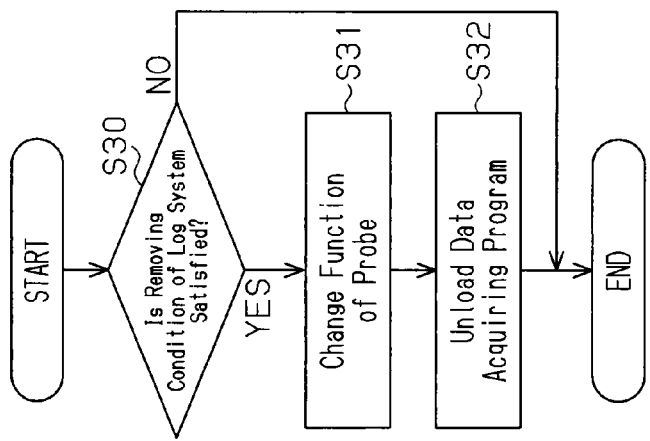
FIG. 12 is a flowchart showing steps of a log system deleting process subsequent to FIG. 11.
Figure 11:
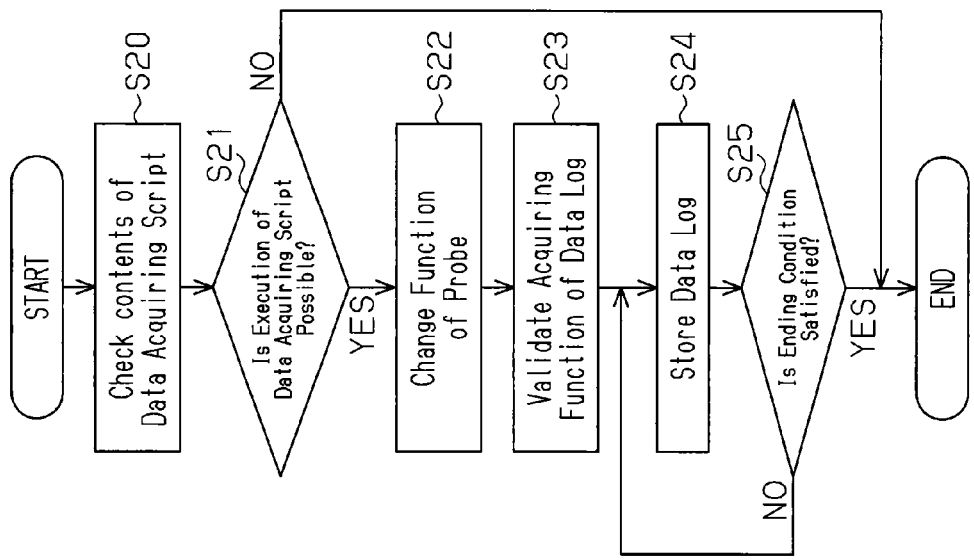
FIG. 11 is a flowchart showing steps of a data log creating process subsequent to FIG. 10.
Figure 10:
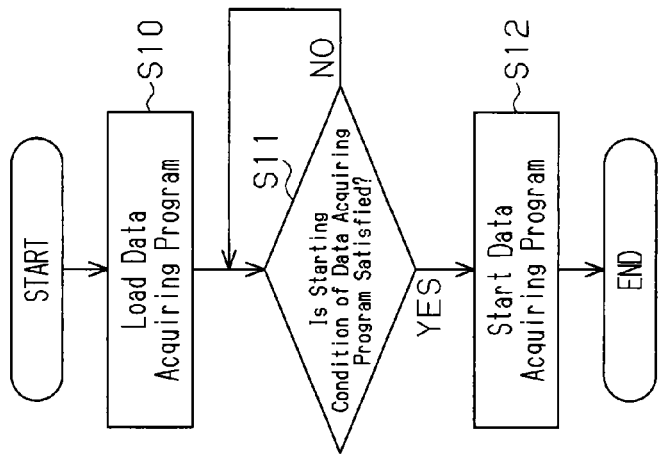
FIG. 10 is a flowchart showing steps of a starting process of the data acquiring program by the in-vehicle information processing device shown in FIG. 2.

Next, a creating procedure of the data log in the present vehicle data acquisition system will be described with reference to FIGS. 10 to 12. FIGS. 10 to 12 are flowcharts describing the creating procedure of the data log. FIG. 10 is a flowchart of the starting process of the data acquiring program 12 in the in-vehicle information processing device 21, FIG. 11 is a flowchart of the data log creating process, and FIG. 12 is a flowchart of the log system deleting process.

Firstly, at the data analysis center 10, the data acquiring program 12 including the acquiring script 40 is transferred to the portable storage device 15. Thereafter, the portable storage device 15 is connected to the in-vehicle information processing device 21 via the interface 34.

As shown in FIG. 10, when the portable storage device 15 is connected to the in-vehicle information processing device 21, the in-vehicle information processing device 21 performs the starting process of the data acquiring program 12. In the starting process, the in-vehicle information processing device 21 detects the data acquiring program 12 stored in the portable storage device 15 by the loader/unloader 16. When the data acquiring program 12 is detected, the in-vehicle information processing device 21 transfers the data acquiring program 12 to the RAM 33, which is loading (incorporating step: step S10 of FIG. 10). When the data acquiring program 12 is loaded to the RAM 33, the in-vehicle information processing device 21 determines whether or not the starting condition shown in the starting condition list 16A of FIG. 3A is satisfied (step S11 of FIG. 10). When determining that the starting condition is not satisfied (NO in step S11 of FIG. 10), the in-vehicle information processing device 21 determines whether or not the starting condition is satisfied every certain period of time. On the other hand, when determining that the starting condition is satisfied (YES in step S11 of FIG. 10), the in-vehicle information processing device 21 causes the vehicle CPU 30 to start executing the data acquiring program 12, that is, runs the data acquiring program 12 (step S12 of FIG. 10). Due to this, the acquisition controlling section 42 starts executing the interpreter 43. As a result of the above, the starting process of the data acquiring program 12 in the in-vehicle information processing device 21 (flowchart of FIG. 10) is ended.

As shown in FIG. 11, when the data acquiring program 12 is run, the in-vehicle information processing device 21 starts the data log creating process. When the data log creating process is started, the in-vehicle information processing device 21 checks whether or not the contents of the acquiring script 40 fulfills the change enabling condition 51 (step S20 of FIG. 11), and determines whether or not the execution of the acquiring script 40 is possible (step S21 of FIG. 11). When determining that the execution of the acquiring script 40 is impossible (NO in step S21 of FIG. 11), the in-vehicle information processing device 21 ends the data log creating process without executing the acquiring script 40.

On the other hand, when determining that the execution of the acquiring script 40 is possible (YES in step S21 of FIG. 11), the in-vehicle information processing device 21 performs the replacing process of the instructions in the respective probe sections P, that is, the function change of the probe sections P according to the probe function changing list 50 shown in FIG. 6 of the acquiring script 40 (replacing step: step S22 of FIG. 11). When the replacing process of the instructions in the respective probe sections P is ended, the in-vehicle information processing device 21 validates the respective data log acquiring function via the respective probe sections P that has been invalidated during the replacing process of the instructions in the respective probe sections P (step S23 of FIG. 11). Further, when the respective probe sections P undergo the execution process accompanying the application program 11 being executed, the vehicle data is acquired based on a function set in the probe sections P that are subjected to the execution process. The acquired vehicle data is successively added to the data log 22 in the storage device 31 (storing step: step S24 of FIG. 11).

When the data log 22 is stored, the in-vehicle information processing device 21 determines as required whether or not the ending condition is satisfied (step S25 of FIG. 11). When determining that the ending condition is not satisfied (NO in step S25 of FIG. 11), the in-vehicle information processing device 21 continues acquiring the vehicle data and adding the same to the data log 22. On the other hand, when determining that the ending condition is satisfied (YES in step S25 of FIG. 11), the in-vehicle information processing device 21 ends the data log creating process (flowchart of FIG. 11) by invalidating the respective data log acquiring function via the probe sections P.

As shown in FIG. 12, after the data log creating process has been ended, the in-vehicle information processing device 21 performs a deleting process to remove the log system such as the data acquiring program 12 from the in-vehicle information processing device 21. In the log system deleting process, the in-vehicle information processing device 21 determines whether or not a removing condition of the log system is satisfied (step S30 of FIG. 12). When determining that the removing condition of the log system is not satisfied (NO in step S30 of FIG. 12), the in-vehicle information processing device 21 ends the deleting process. Further, after this, the deleting process is configured to be executed as required.

On the other hand, when determining that the removing condition of the log system is satisfied (YES in step S30 of FIG. 12), the in-vehicle information processing device 21 performs the probe function change to replace the instructions in the probe sections P again (re-replacing step: step S31 of FIG. 12). When the function change of the probe sections P is ended, the in-vehicle information processing device 21 ends the execution of the data acquiring program 12 in the vehicle CPU 30, and deletes the data acquiring program 12 retained in the RAM 33 by the loader/unloader 16 (step S32 of FIG. 12). Due to this, the application program 11 is restored to a state identical to the state before the data acquiring program 12 was introduced to the vehicle CPU 30, and an executing environment in the vehicle CPU 30 returns to a state that is substantially identical to the state before the data acquiring program 12 was introduced. Due to this, the deleting process of the log system (flowchart of FIG. 12) is ended.

The in-vehicle information processing device 21 moves the data log 22 in the storage device 31 to the portable storage device 15 before starting or during processing of the deleting process of the log system by using the acquisition controlling section 42 of the data acquiring program 12 and the like. Accordingly, the introduction of the vehicle data to the data analysis center 10 becomes enabled, and an available capacity of the storage device 31 can be returned to the state before the creation of the data log 22.

As described above, the vehicle data acquisition system according to the present embodiment achieves the advantages as listed below.

(1) Of the process procedure of the application program 11 that the vehicle CPU 30 of the in-vehicle information processing device 21 executes, a probe section P can be arranged at a position where the process having the vehicle data as the acquiring target is to be executed, that is, at a position that does not have much restriction in the process procedure. Thus, flexibility of the acquisition of the vehicle data through the in-vehicle information processing device 21 using the probe section P is increased. For example, in a configuration of acquiring the vehicle data for each of the processing steps of the application program 11 that the vehicle CPU 30 of the in-vehicle information processing device 21 executes, only the vehicle data corresponding to the result of each of the processing steps can be acquired. However, according to the present embodiment, by arranging the probe sections P inside the program that is within the process procedure included in the processing steps, the vehicle data indicating the operation state of the in-vehicle information processing device 21 in a greater detail can be acquired. Specifically, regardless of process units of a program by the in-vehicle information processing device 21, the probe sections P are arranged at positions in the course of a source code configuring the process units. By so doing, the vehicle data can be acquired in detail by the in-vehicle information processing device 21 via the probe sections P. As a result, even the vehicle data acquired via the probe sections P can be acquired as the vehicle data that can be used for performing the analysis of the operation state of the in-vehicle information processing device 21 with high accuracy. Due to this, accuracy in finding a cause of the malfunction of the in-vehicle information processing device 21 and the like is improved.

(2) The data acquiring program 12 replaces the invalidation instruction in the probe section P with the acquiring instruction for the vehicle data by the in-vehicle information processing device 21, and replaces the probe section P again with the invalidation instruction after having acquired the necessary vehicle data. Due to this, since a work by the engineer and the like to directly change the source code becomes unnecessary, the risk of the alteration and modification causing inaccurate alteration in the source code becomes suppressed. This improves reliability as the vehicle data acquisition system.

(3) As shown in the starting condition list 16A of FIG. 3(*a*) and the condition explaining diagram 16B of FIG. 3B, the necessity of the execution of the replacement of the instructions in the probe sections P is determined in accordance with the state of the vehicle 20 such as the vehicle 20 running or being in a turned-off state, or the key operation in the vehicle and the like. Due to this, the execution of the replacement of the instructions in the probe sections P can be performed in a state of the vehicle 20 suitable for the replacement work (for example, the at-a-halt state). In contrast, the execution of the replacement of the instructions in the probe sections P can be prevented from being performed in a state of the vehicle 20 not suitable for the replacement work (for example, during running). Accordingly, the replacement work of the instructions in the probe sections P can be performed so as not to influence the running of the vehicle 20, so safety in the acquiring process of the vehicle data is increased.

(4) Especially, the replacement work of the instructions in the probe sections P is performed when the vehicle 20 is at a halt. By so doing, even with the replacement work of the instructions in the probe sections P that might influence the running if the vehicle 20 is running, in the present embodiment, the replacement work can be performed while avoiding influence on the running. Due to this, the safety in the acquiring process of the vehicle data via the probe sections P is further improved.

(5) When the execution time of the application program 11 by the in-vehicle information processing device 21 is predicted to exceed the allocated specified time, the replacement of the instructions in the probe sections P is not performed. Due to this, it is possible to avoid, in the execution of the application program 11, the occurrence of an inappropriate process such as the execution of the application program 11 in the in-vehicle information processing device 21 being forcefully terminated for not being completed within the specified time due to the instruction of the probe sections P having been replaced with the acquiring instruction. As a result, the safety in the acquiring process of the vehicle data via the probe sections P is increased.

(6) As shown in the change enabling condition 51 of FIG. 7, for example, in the case where the acquiring process of the vehicle data is determined as giving adverse influence on the execution of the application program 11 by the in-vehicle information processing device 21 by trying to access an inaccessible address, the data acquiring program 12 does not perform the replacement of the instruction in the probe sections P. Due to this, the acquiring process of the vehicle data is prevented from giving adverse influence on the application program 11 being executed by the in-vehicle information processing device 21.

(7) When the acquiring process of the vehicle data does not fulfill the change enabling condition 51 shown in FIG. 7 as the execution condition in the in-vehicle information processing device 21, such as the restriction on access, the restriction on execution time and the like, the in-vehicle information processing device 21 does not perform the replacement of the instruction in the probe sections P. Due to this, the acquiring process of the vehicle data is prevented from giving adverse influence on the information processing being executed by the in-vehicle information processing device.

(8) The data acquiring program 12 is dynamically incorporated in the in-vehicle information processing device 21 via the interface 34. Due to this, the data acquiring program 12 does not need to be provided in the in-vehicle information processing device 21 in advance. Thus, only the process procedure necessary for the application program 11 may be provided in the in-vehicle information processing device 21, and the data acquiring program 12 can be added to the in-vehicle information processing device 21 by a wired communication in accordance with the need to acquire the vehicle data. The wired communication includes communication through various types of LAN, and communication using a connecting interface of an external device such as a USB port.

(9) By acquiring the vehicle data via the probe sections P incorporated in the application program 11, the vehicle data by which the operation of the application program 11, that is, the operation state of the in-vehicle information processing device 21, and moreover the operation of the vehicle 20 can be analyzed in detail can be acquired. Further, even in the case of acquiring the vehicle data from the in-vehicle information processing device 21 by replacing the instruction in the probe sections P with the acquiring instruction, the probe sections P are replaced again with the invalidation instruction by unloading the data acquiring program 12 after the necessary vehicle data has been acquired. Due to this, even after having acquired the vehicle data, the application program 11 of the in-vehicle information processing device 21 is restored to the initial state and retained thereat. Due to this, even after the acquiring process of the vehicle data, safety similar to that at the beginning is ensured in the execution of the application program 11.

(10) The acquired vehicle data is sent to the data analysis center 10 that analyzes the data. Thus, the state of the vehicle 20 is analyzed in detail at the data analysis center 10. Due to this, even in a case where the in-vehicle information processing device that is the target of the analysis is far away from the data analysis center 10, the state of the vehicle 20 based on the operation of the in-vehicle information processing device 21 is analyzed. As a result, by the vehicle data acquired via the in-vehicle information processing device 21 being analyzed, the malfunction and the like that has occurred in the vehicle 20 can be tested and studied. Due to this, a condition under which the analysis of the state of the vehicle 20 can be performed is moderated, whereby the investigations and tests based on the analysis and the like can more easily be carried out, and the investigations and tests can more easily be carried out in a suitable running environment and the like.

Second Embodiment

Figure 13:
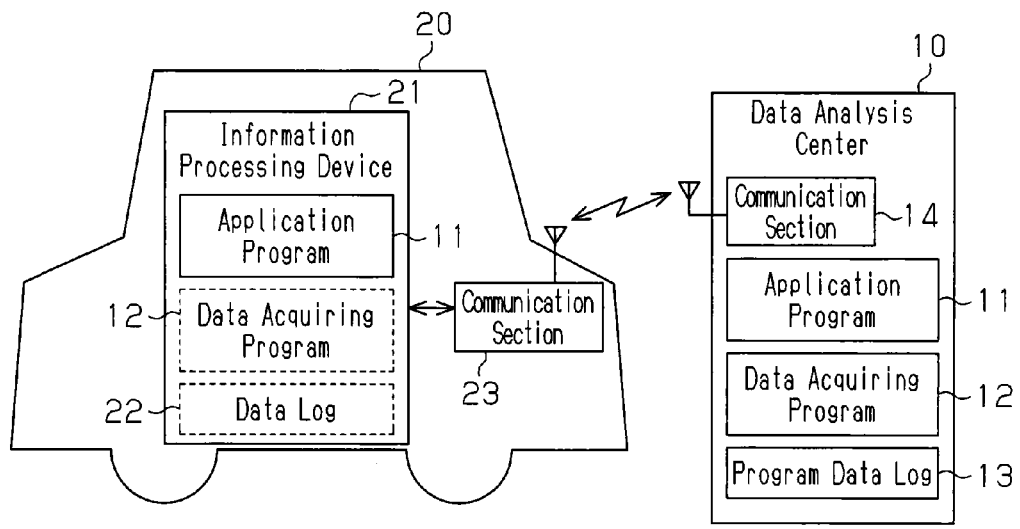
FIG. 13 is a block diagram showing a schematic configuration of a vehicle data acquisition system according to a second embodiment of the invention.

FIG. 13 shows a second embodiment in which the vehicle data acquisition system according to the invention is implemented. As shown in FIG. 13, in relation to the first embodiment, the present embodiment differs in that transmission of vehicle data is performed by a center communication section 14 provided in a data analysis center 10 and a vehicle communication section 23 provided in a vehicle 20, instead of the portable storage device 15. Since other configurations are identical, the same reference signs will be given to the same configurations, and overlapping description thereof are omitted.

As shown in FIG. 13, the center communication section 14 is provided in the data analysis center 10, and the vehicle communication section 23 is provided in the vehicle 20. Since the center communication section 14 and the vehicle communication section 23 can wirelessly communicate with one another, a data acquiring program 12 can be transferred from the data analysis center 10 to the vehicle 20, and a data log 22 can be transferred from the vehicle 20 to the data analysis center 10, via the wireless communication.

Due to this, by transferring the data acquiring program 12 to the vehicle 20 as necessary, the data analysis center 10 can cause the data log 22 to be created in the vehicle 20. Further, the data analysis center 10 can promptly acquire the data log 22 created in the vehicle 20.

Accordingly, the vehicle data acquisition system according to the present embodiment in FIG. 13 achieves advantages equivalent to or similar to those described in (1) to (7), (9), and (10) as the advantages of the first embodiment, and further achieves the following advantages.

(11) The data acquiring program 12 is dynamically incorporated into the in-vehicle information processing device 21 via the wireless communication. Due to this, the data acquiring program 12 does not need to be provided in the in-vehicle information processing device 21 in advance. Due to this, at the beginning, the in-vehicle information processing device 21 is provided only with process procedures necessary for an application program 11. The data acquiring program 12 can be added to the in-vehicle information processing device 21 by the wireless communication in accordance with the needs to acquire the vehicle data.

(12) The vehicle data is sent to the data analysis center 10 by the wireless communication. Thus, the in-vehicle information processing device 21 can acquire the vehicle data irrelevant to a capacity of a storage device 31, and also, can quickly send the vehicle data to the data analysis center 10. Accordingly, tests and investigations of malfunction of the vehicle 20 by an analysis of the vehicle data can more promptly be carried out.

The above embodiments may be modified as follows.

Figure 14:
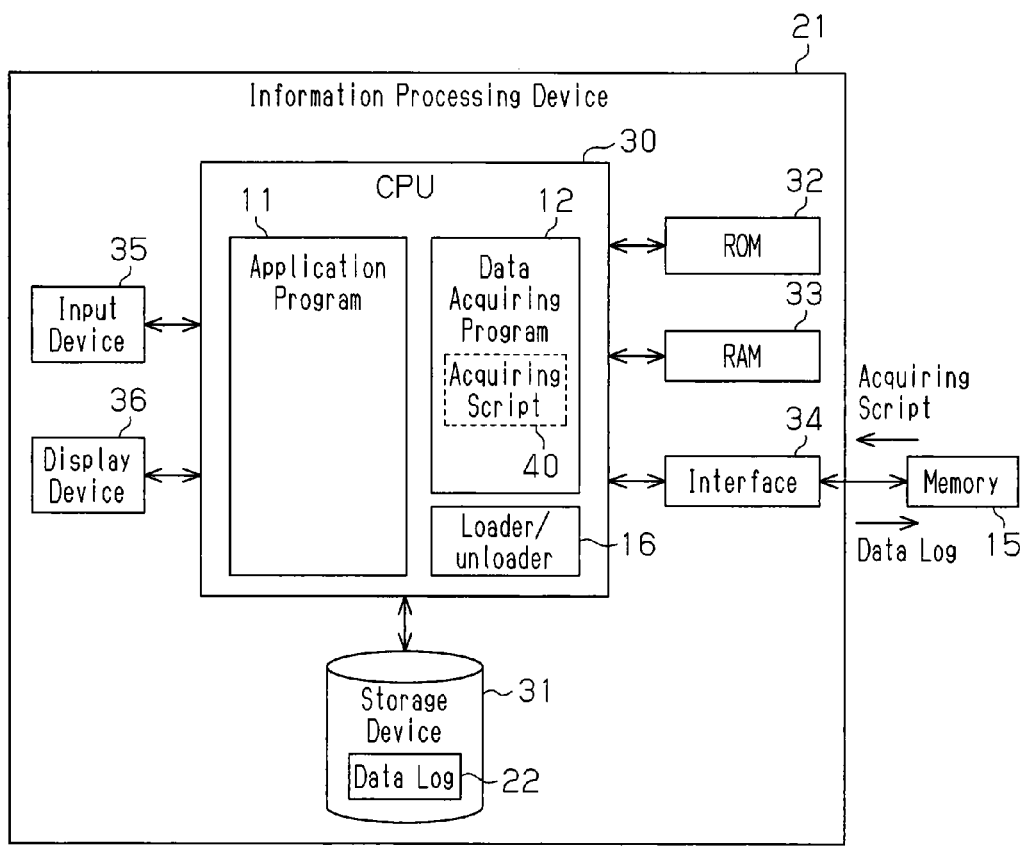
FIG. 14 is a block diagram showing a schematic configuration of an in-vehicle information processing device, which is a vehicle data acquisition system according to a modification of the invention.

In the above embodiments, cases in which the entirety of the data acquiring program 12 is loaded to and unloaded from the in-vehicle information processing device 21 are exemplified. However, no limitation is made hereto, and as shown in FIG. 14, the data acquiring program 12 may be prepared in the in-vehicle information processing device 21 in advance, and only the acquiring script 40 may be loaded to and unloaded from the in-vehicle information processing device 21 via a portable storage device 15. Due to this, flexibility in implementation of the data acquiring program is improved.

In the above embodiments, cases in which the data log 22 of the vehicle 20 is created in the storage device 31 of the vehicle 20 are exemplified. However, no limitation is made hereto, and the data log 22 of the vehicle 20 may be created in the portable storage device 15 connected to the in-vehicle information processing device 21, and may be sent as required by communication and be created directly in the data analysis center 10. For example, the interpreter 43 can create the data log in various memories by changing a creation destination of the data log 22. Alternatively, the acquiring script 40 may designate the creation destination of the data log 22. Due to this, since flexibility in the creation destination of the data log 22 is improved, restriction on storing capacity for storing the data log 22 is avoided, and flexibility in the configuration as the vehicle data acquisition system is improved.

In the above embodiments, cases in which the in-vehicle information processing device 21 is the navigation system are exemplified. However, no limitation is made hereto, and the in-vehicle information processing device 21 can be any of the various control devices that perform the vehicle control, drive assistance, information provision and the like in the vehicle 20. Due to this, adoptability of such a vehicle data acquisition system in the vehicle 20 is improved.

In the above embodiments, cases in which the portable storage device 15 is the USB memory are exemplified, however, no limitation is made hereto, and the portable storage device 15 may be a USB-connected hard disk or a USB flash drive. This improves the adoptability of the portable storage device 15.

In the above embodiments, cases in which the interface 34 is a port with the USB standard are exemplified. However, no limitation is made hereto, and the interface 34 suffices as long as it can connect a device capable of data transmission to the in-vehicle information processing device 21, and it may be an interface compatible with various in-vehicle LAN, a multi-purpose LAN, or standards of various memories. According to the above also, since flexibility in selection of the interface 34 and the portable storage device 15 is improved, the flexibility in the configuration as the vehicle data acquisition system is improved.

In the above embodiments, cases in which the acquiring script 40 is included in the data acquiring program 12 are exemplified, however, no limitation is made hereto, and the acquiring script 40 may be supplied to the data acquiring program 12 when necessary. Due to this, switching the acquiring script 40 can be performed easily, and flexibility in the function to acquire the data log 22 of the data acquiring program 12 is improved.

In the above embodiments, cases in which the determination on whether or not the instructions in the probe sections P are replaced based on the probe function changing list 50 is made based on whether or not the change enabling condition 51 shown in FIG. 7 is satisfied are exemplified. However, no limitation is made hereto, and, in the event where the change enabling condition 51 is not satisfied, a probe section P to be changed may be selected from among the probe sections P that are set such that aforementioned condition will be satisfied, or the replacement may take place by being restricted to only a part of the probe sections P.

That is, in the case where it is predicted that the processing time of the application program 11 will exceed the specified time if the replacement of all of the instructions in the probe sections P is performed, the replacement is performed for only a part of the probe sections P. Due to this, the time required for the execution of the application program 11 by the in-vehicle information processing device 21 is made not to exceed the specified time allocated in advance for the execution of the application program 11. Due to this, the time required for the in-vehicle information processing device 21 to execute the application program 11 can be made to be within the specified time. Accordingly, for example, it is possible to prevent the occurrence of the inappropriate processing such as the forced termination caused due to the execution of the application program 11 by the in-vehicle information processing device 21 not being completed within the specified time. As a result, the safety in the vehicle data acquiring process via the probe sections P is increased, and flexibility regarding the change in the probe sections P is improved.

In the above embodiments, an in-advance checking that the time required for the execution of the application program 11 where the instructions in the probe sections P have been replaced does not exceed the specified time is made. However, no limitation is made hereto, and the acquiring script 40 may be created so that the time required for the execution of the application program 11 where the instructions in the probe sections P have been replaced does not exceed the specified time. Due to this, even in the case where the instructions in the probe sections P are replaced based on the acquiring script 40, the time required for the execution of the application program 11 by the in-vehicle information processing device 21 does not exceed the specified time allocated to the execution of the application program 11.

In the above embodiments, cases in which nine probe sections P1 to P9 are provided in the application program 11 are exemplified. However, no limitation is made hereto, and the number of the probe sections P may be eight or less, or may be ten or more. Due to this, flexibility in arrangement of the probe sections P is improved and more accurate operation analysis can be performed.

In the above embodiments, cases in which one probe section P includes two addresses, such as the probe section P3 being configured with the address xxx15 and address xxx16, are exemplified. However, no limitation is made hereto, and one probe section P may be configured with three or more addresses. Due to this, types of the instructions that can be replaced in the probe sections P is increased, and values desired to be recorded in the data log 22 may be provided as arguments together with the instructions in the probe sections P. Due to this, flexibility in the replacement of the probe sections P is improved, and the flexibility in the vehicle data acquisition is also be improved.

In the above embodiments, cases in which the NOP instruction is incorporated in advance in the probe sections P as the invalidation instruction are exemplified. However, no limitation is made hereto, and other instruction may initially be set in the probe sections P as long as the execution time of the application program 11 and an increase in the CPU load are limited. Due to this, the flexibility in the settings of the probe sections P is improved.

The data acquisition assisting section is not limited to the aforementioned data acquiring program 12, and systems independently configured by hardware, or a logic circuit and the like may be employed. Due to this, flexibility in designing the vehicle data acquisition system is improved.

DESCRIPTION OF THE REFERENCE NUMERALS

10: Data Analysis Center,
11: Application Program,
12: Data Acquiring Program,
13: Program Data Log,
14: Communication Section, 15: Portable Storage Device,
16: Loader/unloader,
16A: Starting Condition List,
20: Vehicle,
21: In-vehicle Information Processing Device,
22: Data Log,
23: Communication Section,
30: Vehicle CPU,
30: Processing Device,
31: Storage Device,
32: Non-volatile Memory,
32: ROM,
33: RAM,
33: Volatile Memory,
34: Interface,
35: Input Device,
36: Display Device,
40: Acquiring Script,
41: Data Output Functions,
41a: Basic Log Function,
41b: CPU State Output Function,
41c: OS State Output Function,
41d: Task Switching Function,
41e: Stack Dump Function,
41f: Memory Dump Function,
42: Acquisition Controlling Section,
43: Interpreter,
44: Command Section,
45: Probe Function Change Processing Section,
46: Function Execution Processing Section,
50: Probe Function Changing List,
51: Change Enabling Condition, and
P, P1 to P9: Probe Section.

The invention claimed is:

1. A vehicle data acquisition system, comprising an in-vehicle information processing device and a storage device, which is configured to acquire vehicle data through the in-vehicle information processing device mounted on a vehicle, and store the acquired vehicle data in the storage device, the in-vehicle information processing device having incorporated therein in advance an information processing section that executes a process procedure of an information processing, the vehicle data acquisition system comprising:
a data acquisition assisting section that is configured to be dynamically incorporated into the in-vehicle information processing device so as to assist acquisition of the vehicle data by utilizing an information processing operation state of the in-vehicle information processing device; and
a probe section that is arranged as a non-operation instruction at one or a plurality of positions where data acquiring process included in the process procedure is executed, wherein
the probe section is configured to be capable of being replaced with another instruction in accordance with a command from the data acquisition assisting section, and
by being incorporated into the in-vehicle information processing device, the data acquisition assisting section is configured to replace the non-operation instruction of the probe section with an acquiring instruction for the vehicle data, store the vehicle data acquired by the replacement acquiring instruction in the storage device in a chronological order, and re-replace the replacement acquiring instruction of the probe section with the non-operation instruction after having acquired the necessary vehicle data.

2. The vehicle data acquisition system according to claim 1, wherein the data acquisition assisting section is configured to determine whether or not to execute the replacement of the instruction in the probe section in accordance with a state of the vehicle.

3. The vehicle data acquisition system according to claim 2, wherein the data acquisition assisting section is configured to execute the replacement of the instruction in the probe section under a condition that the vehicle is at a halt.

4. The vehicle data acquisition system according to claim 1, wherein the data acquisition assisting section is configured not to execute the replacement of the instruction in the probe section when it is predicted that a time required for information processing by the in-vehicle information processing device will exceed a maximum time allocated to the information processing due to executing the replacement of the instruction in the probe section.

5. The vehicle data acquisition system according to claim 1, wherein
the probe section is one of a plurality of probe sections, and the data acquisition assisting section is configured to execute the replacement of the instruction in selected one or more of the probe sections such that a time required for information processing by the in-vehicle information processing device does not exceed a maximum time allocated to the information processing.

6. The vehicle data acquisition system according to claim 1, wherein the data acquisition assisting section is configured not to execute the replacement of the instruction in the probe section when it is determined that the acquiring process to acquire the vehicle data via the probe section will give adverse influence on the information processing executed by the in-vehicle information processing device by trying to access an inaccessible address.

7. The vehicle data acquisition system according to claim 1, wherein the data acquisition assisting section is configured not to execute the replacement of the instruction in the probe section when it is determined that the acquiring process to acquire the vehicle data via the probe section will not fulfill an execution condition including at least one of a restriction on access and a restriction on execution time in the in-vehicle information processing device.

8. The vehicle data acquisition system according to claim 1, wherein
an acquiring instruction for the vehicle data is configured to be prepared in the data acquisition assisting section in advance, and
the acquiring instruction is configured to be created such that a time required for information processing by the in-vehicle information processing device does not exceed a maximum time allocated to the information processing.

9. The vehicle data acquisition system according to claim 1, wherein the data acquisition assisting section is configured to be dynamically incorporated into the in-vehicle information processing device via a wired communication or a wireless communication.

10. The vehicle data acquisition system according to claim 9, wherein
the in-vehicle information processing device is configured to execute the process procedure based on an information processing program that is stored in advance,
the probe section is configured to be incorporated as a non-operation instruction in the information processing program,
the data acquisition assisting section is configured to be implemented by an additional program that includes as a script an acquiring instruction for the vehicle data, the acquiring instruction being configured to be capable of being loaded to the in-vehicle information processing device and unloaded from the in-vehicle information processing device,
the probe section is configured to be replaced with the acquiring instruction for the vehicle data in response to loading of the additional program to the in-vehicle information processing device, and
the probe section is configured to be re-replaced with the non-operation instruction after having acquired the necessary vehicle data or in response to unloading of the additional program from the in-vehicle information processing device.

11. The vehicle data acquisition system according to claim 1, wherein
the vehicle data stored in the storage device is configured to be sent to an analysis center, and
the analysis center is configured to analyze a state of the vehicle based on a change in the vehicle data.

12. The vehicle data acquisition system according to claim 11, wherein the vehicle data is configured to be sent to the analysis center from the storage device via a wireless communication.

13. A vehicle data acquisition method configured to acquire vehicle data through an in-vehicle information processing device mounted on a vehicle, and store the acquired vehicle data in a storage device, the in-vehicle information processing device having incorporated therein in advance an information processing section that executes a process procedure of an information processing,
the vehicle data acquisition method comprising:
dynamically incorporating a data acquisition assisting section in the in-vehicle information processing device, the data acquisition assisting section being configured to assist acquisition of the vehicle data by utilizing an information processing operation state of the in-vehicle information processing device;
replacing, with an acquiring instruction for the vehicle data, a probe section arranged as a non-operation instruction at one or a plurality of positions where data acquiring process included in the process procedure is to be executed in response to incorporating of the data acquisition assisting section into the in-vehicle information processing device, wherein the probe section is configured to be capable of being replaced with a replacement section in response to a command from the data acquisition assisting section;
storing the vehicle data acquired by the replacement section in the storage device in a chronological order; and
re-placing the replacement section with the non-operation instruction after having acquired the necessary vehicle data.

14. The vehicle data acquisition method according to claim 13, wherein, in replacing the non-operation instruction of the probe section with the acquiring instruction for the vehicle, a determination of whether or not to execute the replacement of the instruction in the probe section is made in accordance with a state of the vehicle.

* * * * *